United States Patent [19]

Bieri

[11] Patent Number: 4,557,245
[45] Date of Patent: Dec. 10, 1985

[54] CONCRETE CUTTING OR MILLING APPARATUS INCLUDING A GUIDE RAIL

[75] Inventor: Hans Bieri, Pfaeffikon, Switzerland

[73] Assignee: Hydrostress AG, Pfaeffikon, Switzerland

[21] Appl. No.: 570,006

[22] Filed: Jan. 11, 1984

[30] Foreign Application Priority Data

Jan. 21, 1983 [CH] Switzerland ............................ 351/83

[51] Int. Cl.[4] .............................................. B28D 1/04
[52] U.S. Cl. ..................................... 125/14; 308/3 R; 51/267
[58] Field of Search ....................... 125/13, 14; 51/231, 51/267, 134.5 R, 168; 308/3 R, 6 R

[56] References Cited

U.S. PATENT DOCUMENTS

| 2,413,016 | 12/1946 | Wilken | 51/267 |
|---|---|---|---|
| 2,693,396 | 11/1954 | Gondek | 51/231 |
| 2,904,938 | 9/1959 | Bassoff | 51/267 |
| 3,095,247 | 6/1963 | Zelewsky | 308/3 R |
| 3,247,621 | 4/1966 | Aller | 51/134.5 R |
| 3,378,307 | 4/1968 | Dempsey | 125/14 |
| 3,396,713 | 8/1968 | Schuman | 125/14 |
| 3,722,497 | 3/1973 | Hiestand | 125/14 |
| 3,763,845 | 10/1973 | Hiestand | 125/14 |
| 4,054,179 | 10/1977 | Destree | 125/14 |
| 4,134,459 | 1/1979 | Hotchen | 125/14 |
| 4,184,719 | 1/1980 | Ward | 125/14 |

Primary Examiner—Harold D. Whitehead
Attorney, Agent, or Firm—W. G. Fasse; D. H. Kane, Jr.

[57] ABSTRACT

A concrete cutting or milling apparatus has a milling head carrying a power driven circular saw blade or milling cutter movable along a guide rail having a plurality of guide rail sections that may be coupled to each other in the longitudinal direction. The guide rail sections are supported by a foot structure that can be screwed to a concrete member, such as a wall or floor, to be cut. The foot structure is releasably secured to the guide rails however in a torsion stiff manner. Further, the foot structure is provided with adjustment screws for the proper axial alignment of the guide rail sections relative to each other to provide for a correction of the rail position and for compensating an unevenness in the surface of the concrete member to be cut. The structure is lightweight and one operator can secure the rail sections to a concrete surface. The rail sections form a closed cross-sectional tubular shape which may be round or substantially box shaped.

15 Claims, 5 Drawing Figures

CONCRETE CUTTING OR MILLING APPARATUS INCLUDING A GUIDE RAIL

BACKGROUND OF THE INVENTION

The invention relates to a concrete cutting or milling apparatus comprising a guide rail and a power driven circular saw blade carried by a milling head. The milling head is removable from the guide rail.

The development of concrete milling machines, for example, for cutting into or completely severing concrete walls, floors, slabs and the like must overcome substantial difficulties. On the one hand, the cutting capacity shall be as large as possible so that such milling devices are competitive with other concrete cutting methods. On the other hand, high cutting capacities call for a powerful drive motor which, as a result of its power rating, becomes rather heavy. Additionally, the forces that must be taken up by a guide rail also increases with an increasing cutting capacity. As a result, prior art guide rail structures also have been strong and correspondingly heavy. Opposed to the just outlined requirements, one must take into account that the concrete cutting apparatus shall remain as light as possible so that it is portable and the securing of the guide rail shall be possible preferably by a single operator even if he must stand on a ladder without any problems or difficulties.

OBJECTS OF THE INVENTION

In view of the foregoing it is the aim of the invention to achieve the following objects singly or in combination:

to construct a concrete cutting or milling machine in such a way that it remains lightweight to be portable together with its guide rail structure while still providing the desired cutting capacity;

the cutting apparatus and its guide rail system shall be simple in its operation and the guide rail system shall be mountable even if the operator is alone and standing on a ladder;

to construct the guide rail system in such a way that cuts may be made of substantially any desired length by removing guide rail sections behind the apparatus and installing these sections in front of the cutting apparatus;

to provide means for properly adjusting the cutting depth of the saw blade or milling cutter; and to provide an efficient cooling of the saw blade or milling cutter.

SUMMARY OF THE INVENTION

The concrete circular saw or milling cutter according to the invention comprises a power driven circular saw blade carried by a milling head which is displaceable along a guide rail and attachable as well as removable from the guide rail. The guide rail includes several sections, each of which is formed as a tubular member having a closed cross-sectional shape, either in the form of a pipe cross-section or a box cross-section. Each section is provided at its ends with coupling elements so that the sections may be interconnected in longitudinal alignment with each other. Each guide rail section is provided with at least one support foot structure connected to the guide rail in a torsion stiff manner. Each support food structure is provided with adjustment members for properly aligning the sections relative to each other to thereby compensate for any irregularities in the surface of the concrete member to be cut.

The milling head according to the invention which carries the milling cutter or saw blade comprises a drive shaft and a saw blade carrying tilting arm rotatably secured to the housing in which the drive shaft is rotatably supported by bearings. The radially outer end of the saw blade carrying tilting arm is provided with a hub to which the saw blade is attached. By tilting the arm around the drive shaft the depth of the cut may be adjusted. Power transmission means, for example, sprocket wheels and drive chains are operatively arranged between the drive shaft output and the blade carrying hub.

The just described arrangements of the components permit the use of a relatively large diameter circular saw blade providing for a high cutting capacity while simultaneously making the weight of the milling head sufficiently small so that the apparatus is portable by a single person. Another advantage is seen in that the entire structure is easily attachable to and removable from the guide rail which itself may be of lightweight construction because of its secure mounting to the surface of a concrete member to be cut, such as a wall, floor, or slab. The secure mounting of the guide rail sections permits taking up the high forces occurring during the cutting or milling operation.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION:

The present concrete saw or milling cutter comprises three separate power drives. One power drive rotates a circular saw blade. A second power drive feeds a milling head along a guide rail. A third power drive adjusts the angular position of a saw blade carrying arm for determining the depth of a cut.

Figure 1:
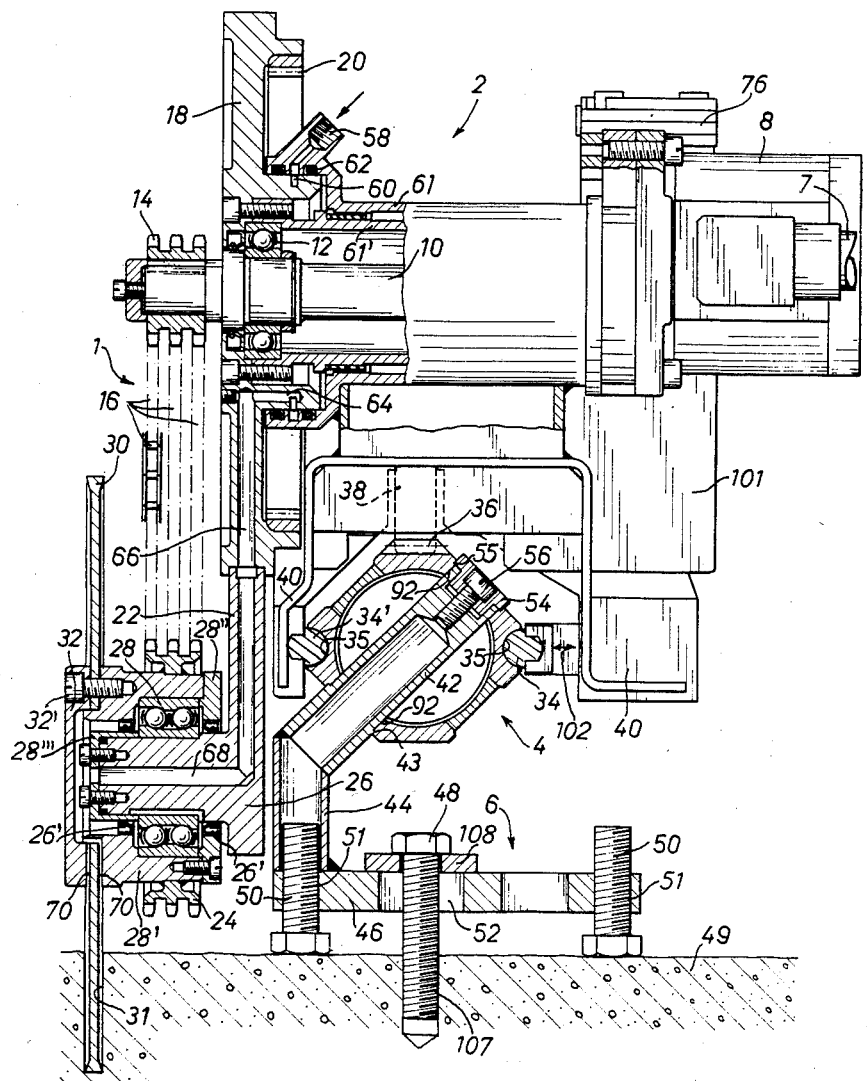
FIG. 1 is a sectional view through a concrete milling cutter or circular saw according to the invention.

Referring first to FIG. 1 the circular concrete saw 1 comprises a milling head 2 carrying a circular saw blade 30 for cutting a concrete member 49, such as a floor or wall or the like. The cut may be a groove 31 or it may cut entirely through a concrete slab. The milling head 2 is movable along a guide rail structure 4 with a power feed advance as mentioned above and as will be described in more detail below. The guide rail structure 4 is rigidly secured to a support foot structure 6 which in turn is rigidly, but adjustably secured to the surface of the concrete member 49.

The milling head 2 comprises a drive shaft 10 driven by a hydraulic drive motor 8 which receives hydraulic power through a conduit 7 from a source of hydraulic pressure not shown. The drive shaft 10 is operatively supported at both ends by anti-friction or ball bearings 12 held in an inner housing member 61' which in turn is supported in an outer housing 61. The free outer end of the drive shaft 10 carries a first sprocket wheel 14 rigidly connected to the free shaft end for transmitting the torque to the sprocket wheel 14. Three drive chains 16, for example, driven by the sprocket wheel 14 engage a second wheel 24 rigidly secured to a blade carrier 28' which is in turn rotatably secured to a hub 26 through antifriction bearings 28. The saw blade 30 is secured to the blade carrier 28' by a cover member 32, whereby screws 32' extend through the cover 32 and into the blade carrier 28'. The bearing 28 is protected by seals 26' operatively arranged between a part of the hub 26 and the blade carrier 28'. A first bearing cover 28'' is screwed to the blade carrier 28' for holding the outer race of the bearing 28. A second bearing cover 28''' is screwed to the free end of the hub 26 for holding the inner race of the bearing 28 in place on the hub 26.

Figure 5:
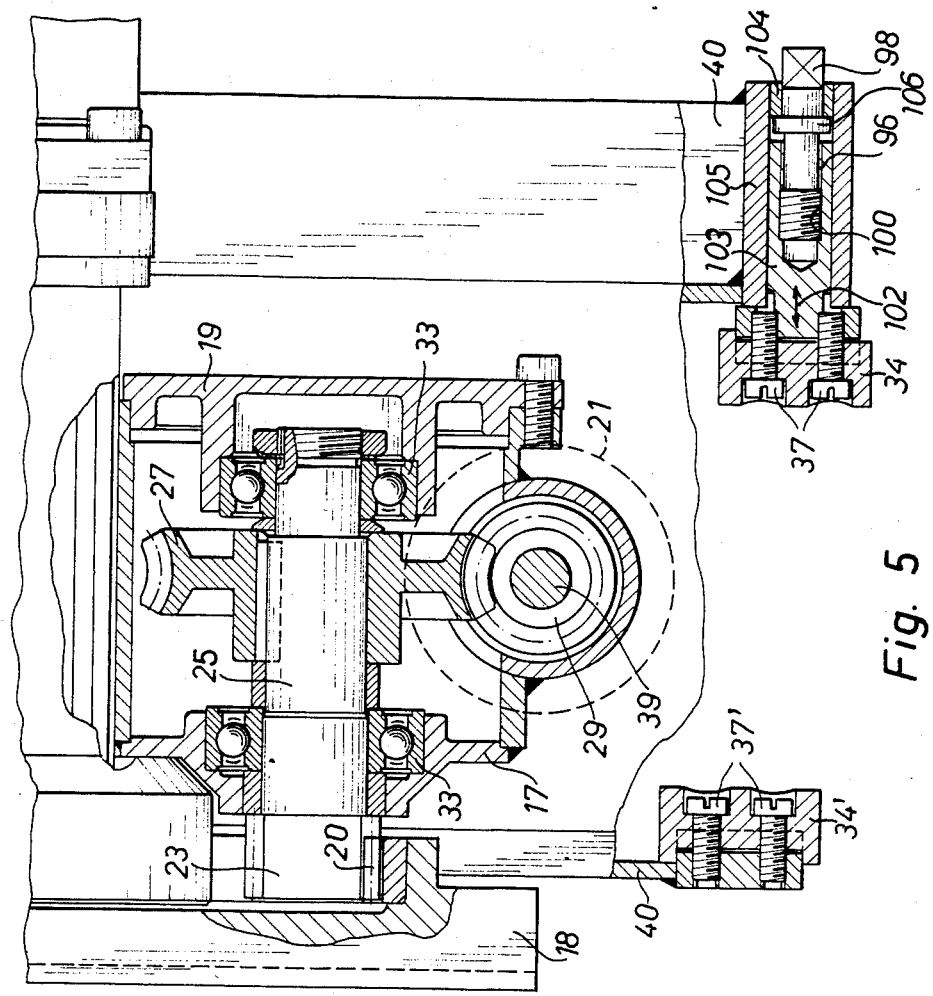
FIG. 5 is a sectional view through the drive mechanism for the tilting of the saw blade carrying arm for adjusting the depth of the cut, FIG. 5 also shows the adjustment means for the guide members of the milling head.

The hub 26 is rigidly connected through a radially extending arm 22 with a turntable 18. By rotating the turntable 18 and with it the saw blade carrying arm 22, it is possible to adjust the cutting depth of the saw blade 30. For this purpose the turntable 18 is provided with a gear, for example, a radially inwardly facing gear 20 which meshes with a drive pinion 23 as shown in more detail in FIG. 5. Referring to FIG. 5, the pinion 23 is secured to or forms part of a power output shaft 25 supported by bearings 33 held in a respective housing portion by bearing covers 17 and 19. The shaft 25 carries in a torque transmitting manner a worm wheel 27 meshing with a worm gear 29 supported in a torque transmitting manner on a vertical output shaft 39 of a hydraulic drive motor 21. The hydraulic drive motor 21 may be driven in one or the other directions, whereby the arm 22 and thus the circular saw blade 30 may be tilted about the drive shaft 10 for adjusting the cutting depth in the concrete member 49 to be cut. The tilting range of the arm 22 should be at least 120°, preferably, however, it should be 360°.

Figure 2:
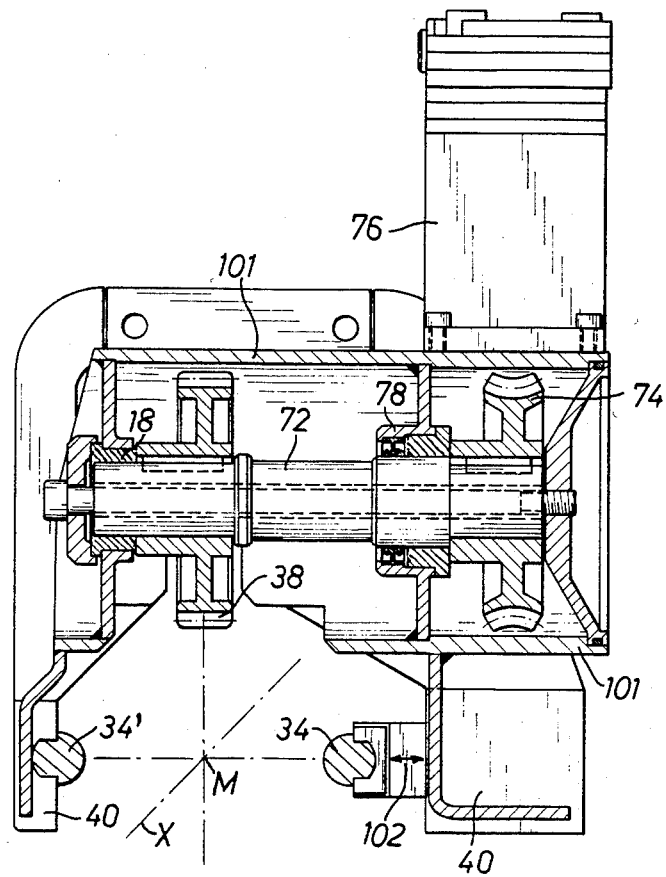
FIG. 2 is a view partially in section through the feed advance drive mechanism for moving the milling cutter along its guide rail.

Referring to FIGS. 1 and 2 in combination, the second drive means for moving the milling head 2 along the guide rail 4 will now be described. For this purpose the guide rail 4 is constructed at its top edge as a toothed rack 36 which meshes with a power driven pinion 38 shown in more detail in FIG. 2. The pinion 38 is mounted in a torque transmitting manner to a drive shaft 72 supported by bearing means 78 in the housing portion 101. A worm wheel 74 is secured in a torque transmitting manner to the free end of the shaft 72 and driven by a hydraulic motor 76 through a worm gear not visible in FIG. 2, but located behind the worm wheel 74. By operating the hydraulic motor 76 the pinion 38 advances the milling head 2 along the guide rail 4 by meshing with the toothed rack 36. The housing portion 101 of the milling head 2 is provided with carrier arms 40 which carry slide members 34, 34' riding in diametrically opposite guide grooves 35 of the guide rail 4. At least one of the slide members 34 is horizontally adjustable back and forth as indicated by the arrow 102 for movably securing the milling head 2 to the rail 4 or for removing the milling head 2 from the rail 4. Referring to FIG. 5, the left-hand slide member 34' is secured to the arm 40 by recessed screws 37'. However, the right-hand slide member 34 is secured by recessed screws 37 to a carriage 103 slideable back and forth in a bore 104 of a sleeve 105 rigidly secured to the lower end of the righ-hand arm 40. The carriage 103 has a threaded bore 96 cooperating with the threading 100 of a spindle 98. The spindle 98 is rotatably held in the bore 104 by a spindle bearing 106. By rotating the free end of the spindle 98 the carriage 103 will slide back or forth in the bore 104 as indicated by the arrow 102. For this purpose the free end of the spindle may have a square shape for cooperation with a respective tool. By moving the carriage 103 to the right, the slide member 34 is moved out of the respective groove 35 in the guide rail 4 for removing the milling head 2 from the rail 4. Similarly, by moving the carriage 103 to the left, the milling head 2 may be secured to the guide rail 4 in a slideable manner.

Figure 3:
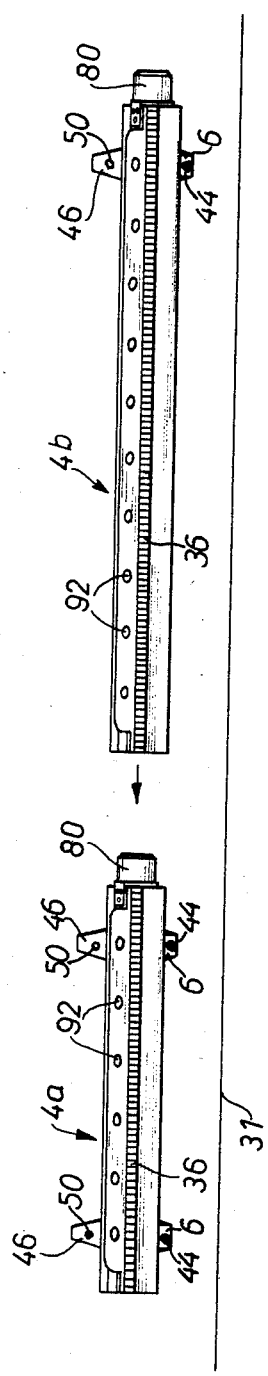
FIG. 3 illustrates a top plan view of two guide rail sections about to be interconnected to each other.

The guide rail 4 consists of an integral single piece of metal and is preferably made of sectional steel having a tubular cross-section in the form of a pipe or box shape providing a closed guide rail cross-section comprising a plurality of guide rail sections 4a, 4b as best seen in FIG. 3. Any number of guide rail sections may be employed. As best seen in FIG. 1, the guide grooves 35 are preferably arranged in a horizontal plane and alongside of diametrically opposite corners of the guide rail 4. Preferably, the guide grooves 35 are milled into the material of the rail profile. Similarly, the toothed rack 36 is also milled into the guide rail profile so that the grooves 35 and the toothed rack 36 form integral components of the guide rail system.

Each rail section is provided with at least one support foot structure 6 for spacing the assembled rail system from the surface of the concrete member 49. Each foot support structure comprises adjustment means for aligning the rail sections longitudinally relative to each other and for compensating irregularities in the surface of the concrete member 49.

Each support foot structure 6 comprises a slanted guide rail carrier arm 42 rigidly secured to a foot plate 46 through a support member 44 extending at right angles from the foot plate 46. The foot plate 46 comprises in its central area at least one through-hole 52 for a securing screw or lag bolt 48 which is screwed into a predrilled hole 107 in the concrete member 49 to hold down the foot blade 46 preferably with the aid of a suitable washer 108. A masonry dowel, not shown, may be used in the hole 107 if necessary. Two adjustment screws 50 extend through threaded holes 51 in the foot blade 46 for the above mentioned adjustment of the rail sections longitudinally relative to each other. Thus, irregularities in the surface of the concrete member 49 may be compensated. Each rail section is provided with a plurality of through-holes 92 arranged so that the central axis of these holes extends at a slant corresponding to the slant desired for the carrier arm 42. FIG. 3 shows that along the length of each rail section 4a, 4b a substantial number of such holes or cross bores 92 may be provided for selectively placing the support foot structure or structures 6, whereby a substantial freedom of choice is provided in the arrangement of the support foot structures along the rail length to thereby also take into account the surface configuration of the concrete member 49.

The slanted carrier arm 42 has a shoulder cooperating with a respective shoulder in the support rail as shown at 43 in FIG. 1. A clamping plate 54 having a rectangular or square shape cooperates with a shoulder 55 and a screw 56 reaching into a threaded axial hole in the free end of the arm 42 for rigidly securing the arm 42 inside the respective rail section. Preferably, a locking key plate 94 is rigidly secured to the connecting arm 42. The key plate 94 has, for example, a rectangular or square shape and cooperates with a respectively shaped locking groove 90 in the rail section for preventing rotation of the connecting arm 42 in its mounting bore 92. Thus, a torsion stiff connection is provided between the support foot structure 6 and the guide rail 4.

The slanted position of the connecting or carrier arm 42 includes an angle of 40° to 50° with a horizontal plane or with a vertical plane extending through the central longitudinal axis of the guide rail 4. Preferably, the angle is 45°. FIG. 2 shows how the slanting axis X of the arm 42 passes through the center M of the guide rail 4 defined by the just mentioned horizontal and vertical planes. The respective horizontal plane preferably extends through the center of the two slide members 34 and 34'. The vertical plane extends preferably through the center of the drive pinion 38.

Figure 4:
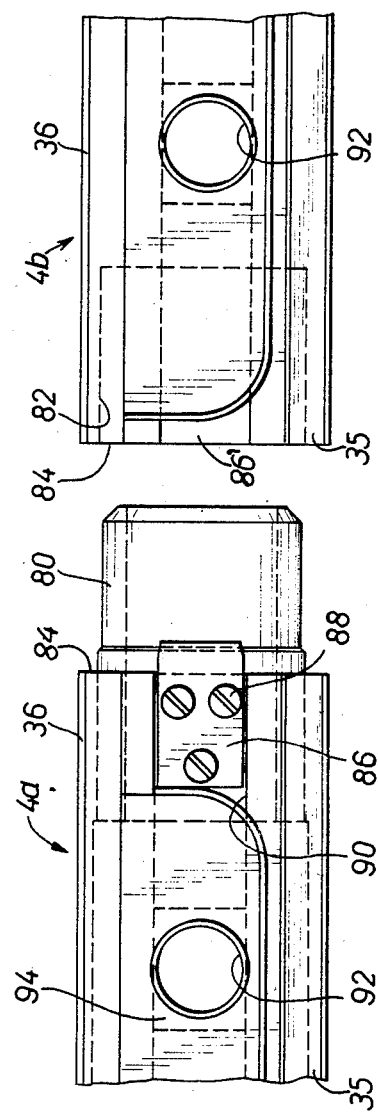
FIG. 4 shows two ends of two adjacent guide rail sections with the respective coupling elements.

As shown in FIG. 3 a first guide rail section 4a is provided with two support feet structures 6 while the second guide rail section 4b is provided with only one support foot structure 6. The coupling and centering between the two rail sections 4a and 4b is accomplished by a coupling stud 80 fitting into a respective hole 82 in an adjacent rail section. The stud 80 may be cylindrical or slightly conical. The respective hole 82 is shown in FIG. 4. Once the stud 80 is fully received in the hole 82, the facing ends 84 of the two adjacent rail sections abut against each other. Preferably, the facing surfaces 84 at the ends of each rail section are so shaped that an abutting contact takes place only in the zone of the toothed rack 36, whereby small angular deviations can be accommodated without interfering with the proper feed advance of the milling head 2. To make sure that adjacent rail sections are fitted to each other with a proper angular orientation, one end of a rail section is provided with a centering plate 86 secured by screws 88, for example, to one end of a rail section 4a and fitting into a respective groove 86' in the adjacent end of the next rail section 4b.

The present concrete cutting apparatus is operated as follows. First, the guide rail 4 is secured to the concrete member 49 in parallel to a slot 31 to be cut, whereby one begins with the securing of the first or shorter rail section 4a. Initially, the screws 50 are adjusted to a rough position, leaving enough space between the surface of the concrete member 49 and the downwardly facing surface of the foot plate 46 so that a wrench or other suitable tool may be applied to the heads of the adjustment screws 50. Further, the length of the upright support member 44 is such that there is sufficient space for the insertion of the securing screws 48. As soon as the first section 4a is thus connected, the next section 4b may be inserted with the coupling studs 80 reaching into the coupling hole 82 and with the securing of the respective screw 48 in a predrilled hole of the concrete member 49. One supporting foot structure is sufficient for the further rail sections because the force transmission is adequately accomplished through the centering and coupling members 80, 82. This type of structure has the advantage that it may be secured to a concrete member by one operator without any assistant even if the operator is standing on a ladder. Additional tightening of the screws 48 and 50 may then be made and further rail sections may be used if desired. However, it is a further advantage of the present apparatus that after a slot 31 has been partially cut, an initial rail section may be removed behind the milling head where the slot has already been cut and attached in front of the milling head.

After the securing of the guide rails the milling head 2 is secured to the first rail section by inserting the two slide members 34 and 34' into the grooves 35 and then just sufficiently tightening the spindle 98 to permit the sliding movement along the rail 4.

Thereafter, the drive motor 8 is provided with hydraulic pressure for rotating the saw blade 30. Once the saw blade rotates, the drive motor 21 is operated to rotate the pinion wheel 20 and thereby tilting the arm 22 for feeding the circular saw blade 30 into the concrete member 39 to the desired depth. Conventional, adjustable stop means may be provided for determining the depth of the groove 31 being cut. Thereafter, the hydraulic feed advance motor 76 is switched on and the groove is being cut as the milling head 2 is advanced along the guide rail 4 by the meshing between the rack 36 and the pinion 38.

Referring again to FIG. 1, the present apparatus is provided with cooling ducts for supplying a cooling liquid such as water to the rotating saw blade 30. For this purpose the housing 61 is provided with an inlet nipple 58 connectable to a water hose, for example, by a snap connection. The nipple 58 leads into a ring groove 60 sealed on both sides by sealing rings 62. The ring groove 60 leads into a bore 64 in the turntable 18. This bore 64 extends in parallel to the rotational axis of the drive shaft 10 and connects to a radial bore 66 in the turntable 18 and in the connecting arm 22. The radial bore 66 in turn connects to a central hub bore 68 which opens into the hollow cover 32 which in turn connects to grooves 70 on both sides of the saw blade 30 to supply the cooling liquid to both sides of the blade for effectively cooling the blade as it produces the grooves 31.

Although the invention has been described with reference to specific example embodiments, it will be appreciated that it is intended to cover all modifications and equivalents within the scope of the appended claims.

What is claimed is:

1. A concrete cutting apparatus, comprising guide rail means, a milling head for carrying a motor driven circular saw blade, securing means for movably and releasably securing said milling head to said guide rail means, said guide rail means comprising a plurality of guide rail sections each having means for operatively joining adjacent guide rail sections to each other, each guide rail section comprising at least one support foot structure and connecting means for operatively connecting the support foot structure to the respective guide rail section, said support foot structure further comprising adjustment means for adjusting and correcting the position of said guide rail sections relative to each other and relative to a concrete member to be cut, wherein said milling head comprises housing means, shaft means, bearing means rotatably mounting said shaft means in said housing means, saw blade carrier arm means rotatably mounted to said housing means, saw blade hub means rotatably mounted to a radially outer end of said saw blade carrier arm means, each of said guide rail sections comprising along its length a plurality of cross bores extending through each guide rail section, said connecting means fitting selectively into any one of said cross bores in a releasable manner for locating said support foot structure selectively along the length of the rail section, said cross bores extending at a slanting angle through the respective rail section relative to a vertical or horizontal longitudinal plane through the rail section, and wherein said guide rail sections further comprise an integral single piece hollow steel section having a closed cross-section, two guide means for guiding said milling head, one guide means being located on one side of the closed cross-section, the other guide means being located diametrically opposite said one guide means and an integral tooth rack located between said two guide means, said cross bores forming aligned pairs of bores such that a common axis extending through both bores slants toward said saw blade, whereby a spacing between said saw blade and said support foot structure is minimized.

2. The apparatus of claim 1, wherein said slanting angle is within the range of about 40° to about 50°, and wherein said connecting means comprise connecting arms extending through said cross bores, and torque arresting means operatively arranged between said connecting arms and a respective one of said cross bores for preventing relative rotation of said connecting arm in said cross bore.

3. The apparatus of claim 2, wherein said torque arresting means comprise a locking groove (90) in said rail means and a locking key plate (94) rigidly secured to the respective connecting arm for preventing rotation of the connecting arm in its cross bore.

4. The apparatus of claim 3, wherein said locking key plate is rectangular and fitting in a locking manner into said locking groove for preventing rotation of the connecting arm in its cross bore.

5. The apparatus of claim 1, wherein said support foot structure comprises a foot plate and two threaded holes in said foot plate, said adjustment means comprising two adjustment screws extending through said threaded holes, said foot plate further comprising at least one through-hole for passing an attachment screw bolt through said through-hole and for attaching said guide rail section to said concrete member to be cut.

6. The apparatus of claim 1, wherein said securing means for said milling head comprise at least two slide members adapted for guided sliding movement along said guide rail means, and adjustable positioning means operatively connected to at least one of said slide members for adjusting the slide member back and forth in a direction perpendicularly to the length of said guide rail means.

7. The apparatus of claim 1, further comprising speed conversion means operatively arranged between said shaft means and said saw blade hub means for driving a saw blade attached to said hub means.

8. The apparatus of claim 7, wherein said speed conversion means comprise first sprocket wheel means on said shaft means and second sprocket wheel means on said hub means and drive chain means operatively interconnecting said first and second sprocket wheel means providing a speed reduction from said shaft means to said hub means.

9. The apparatus of claim 7, further comprising cooling liquid supply duct means extending from said housing means through said saw blade carrier arm means to said saw blade hub means, and cover means for securing a saw blade to said saw blade hub means, said cover means and said saw blade hub means having channels therein connected to said duct means for supplying cooling liquid to both sides of a saw blade.

10. A milling head for a concrete cutting apparatus, comprising non-rotatable housing means, shaft means, bearing means rotatably mounting said shaft means in said non-rotatable housing means, saw blade carrier arm means rotatably mounted to said non-rotatable housing means, saw blade hub means rotatably mounted to a radially outer end of said saw blade carrier arm means, speed conversion means operatively arranged between said shaft means and said saw blade hub means for driving a saw blade attached to said hub means, cooling liquid supply duct means (58) extending from said non-rotatable housing means (61) through said saw blade carrier arm means (22) to said saw blade hub means (26), and cover means (32) for securing a saw blade to said saw blade hub means, said cover means having radially extending channels and said saw blade hub means having axially extending channels therein connected to said duct means for supplying cooling liquid to both sides of a saw blade, said milling head further comprising securing means including at least two slide members adapted for guided sliding movement along a guide rail means, and adjustable positioning means operatively connected to at least one of said slide members for adjusting the slide member back and forth in a direction perpendicularly to the length of a guide rail means.

11. The milling head of claim 10, wherein said speed conversion means comprise first sprocket wheel means on said shaft means and second sprocket wheel means on said hub means and drive chain means operatively interconnecting said first and second sprocket wheel means providing a speed reduction from said shaft means to said hub means.

12. A guide rail structure for a concrete cutting apparatus, comprising a plurality of guide rail sections each guide rail section comprising a unitary hollow tubular steel beam having a closed approximately square cross-sectional box shape, coupling means for releasably joining adjacent guide rail sections to each other in the longitudinal rail direction, each guide rail section comprising as an integral part of the respective rail section two guide members extending along two opposite corners of the respective guide rail section, toothed rack means forming an integral part along a third corner of said box shape and extending longitudinally of the respective guide rail section between said guide members, and a plurality of pairs of cross bores in each guide rail section for securing the guide rail sections to a support foot structure, one cross bore of said pairs of cross bores being located in a section wall below one of said guide members, the other cross bore of said pairs of cross bores being located in a section wall above the other of said guide members, whereby the cross bores of a pair are aligned with each other along an axis extending substantially in parallel to two opposite section walls and at about 45° to a plane defined by said two guide members.

13. A milling head for a concrete cutting apparatus comprising housing means, drive shaft means (10), bearing means rotatably mounting said drive shaft means in said housing means, saw blade carrier arm means rotatably mounted to said housing means, saw blade hub means rotatably mounted to a radially outer end of said saw blade carrier arm means, and speed conversion means operatively arranged between said drive shaft means and said saw blade hub means for driving a saw blade attached to said hub means, wherein said speed conversion means comprise first sprocket wheel means on said drive shaft means and second sprocket wheel means on said saw blade hub means and drive chain means operatively interconnecting said first and second sprocket wheel means for providing a speed reduction from said drive shaft means to said saw blade hub means, said milling head further comprising a first hydraulic drive motor (8) supported on said housing means (61) for driving said drive shaft means (10) for rotating said saw blade (30), a further shaft (72), a second hydraulic motor (76) rotatably connected to said further shaft (72), a pinion (38) arranged on said further shaft (72) for cooperating with a toothed rack (36) of a guide rail means, and means for turning said saw blade carrier arm means (22) for tilting it about said drive shaft means (10) for adjusting the cutting depth of the saw blade.

14. The milling head of claim 13, wherein said means for turning said saw blade carrier arm means (22) comprise a third shaft (25), a third hydraulic drive motor (21) rotatably connected to said third shaft (25), a turntable means for supporting said saw blade carrier arm means, a drive pinion (23) arranged on said third shaft (25), said saw blade carrier arm means (22) extending radially from said turntable means (18), gear means (20) connected to said turntable means and meshing with said drive pinion (23) for adjusting the cutting depth of the saw blade (30).

15. The milling head of claim 14, further comprising bearing means for rotatably mounting said turntable means on said drive shaft means.

* * * * *